June 28, 1927. 1,634,249
S. LINDEQUIST
EXPLOSION ENGINE WITH FOUR OR MORE WORKING CYLINDERS
Filed March 30, 1925 7 Sheets-Sheet 1

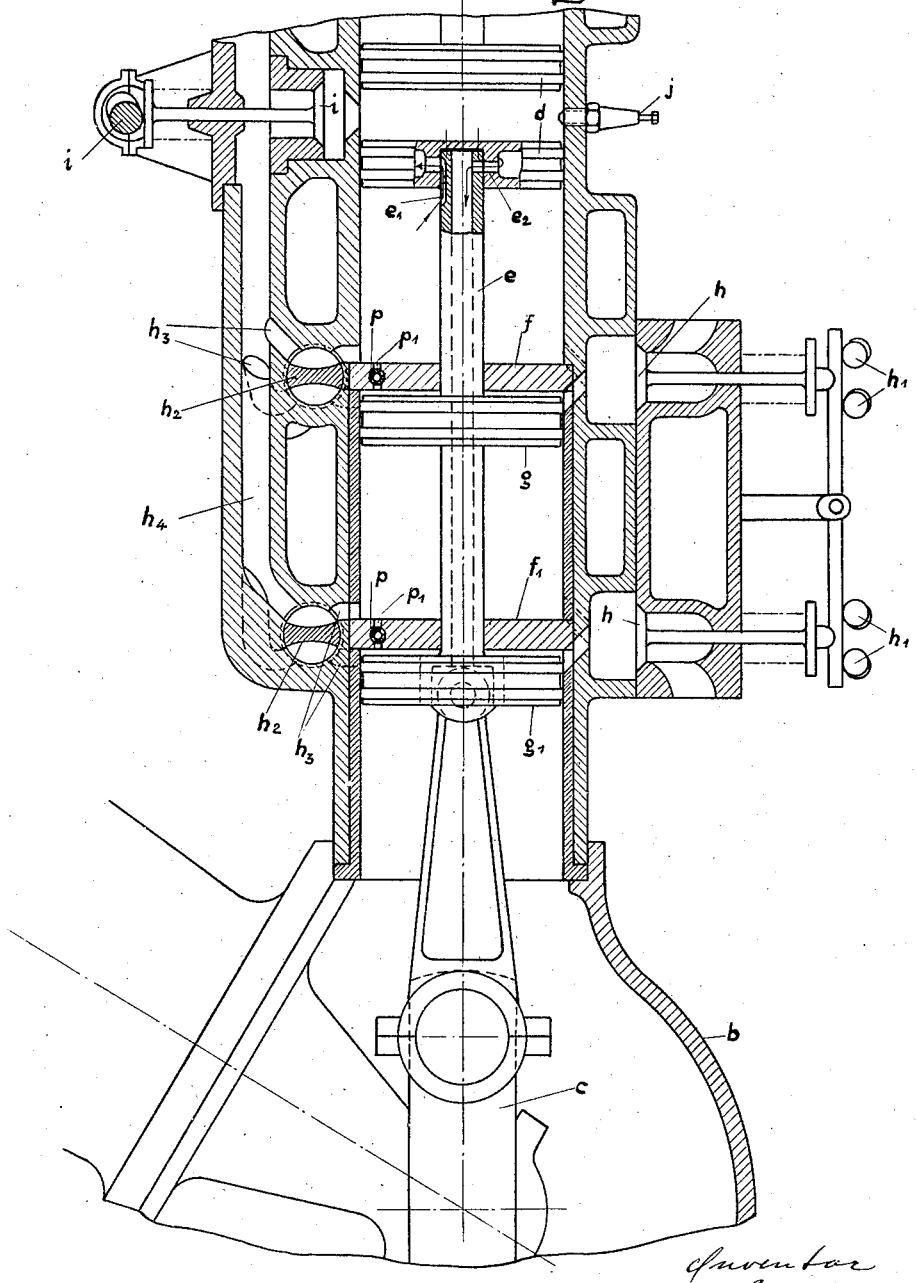

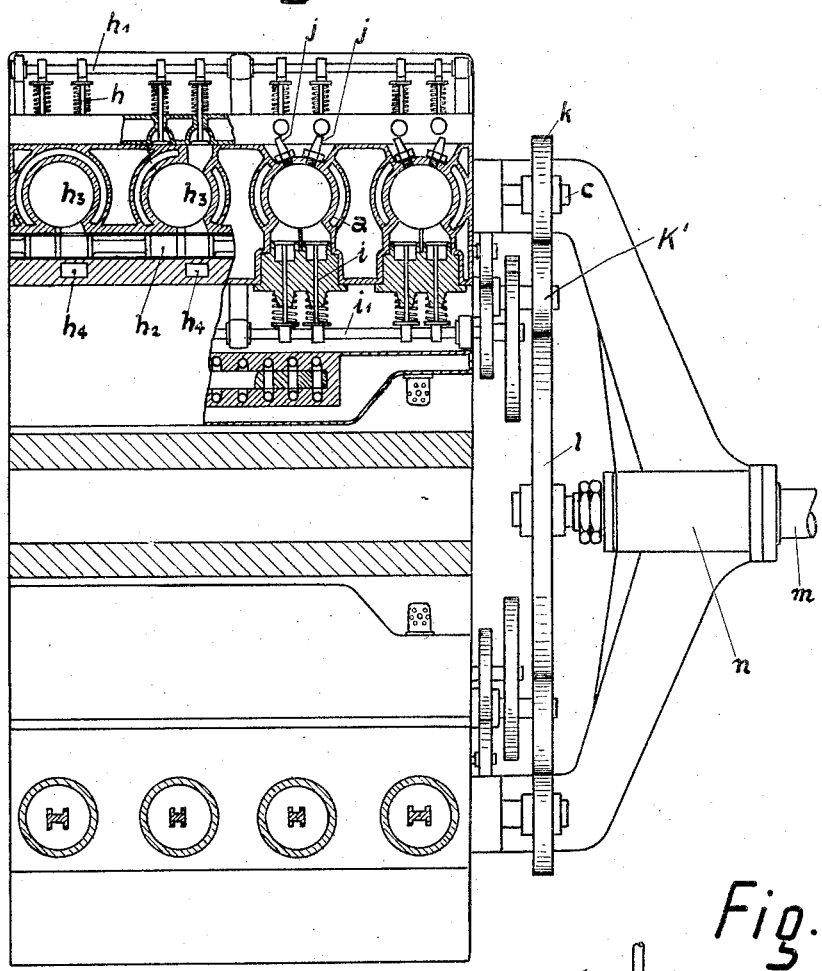
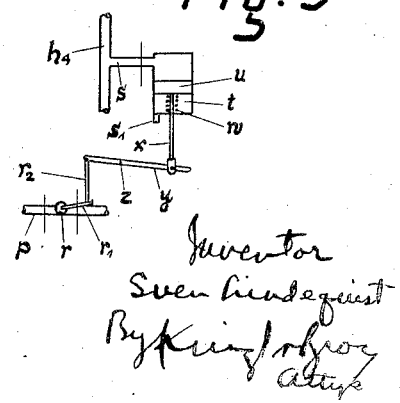

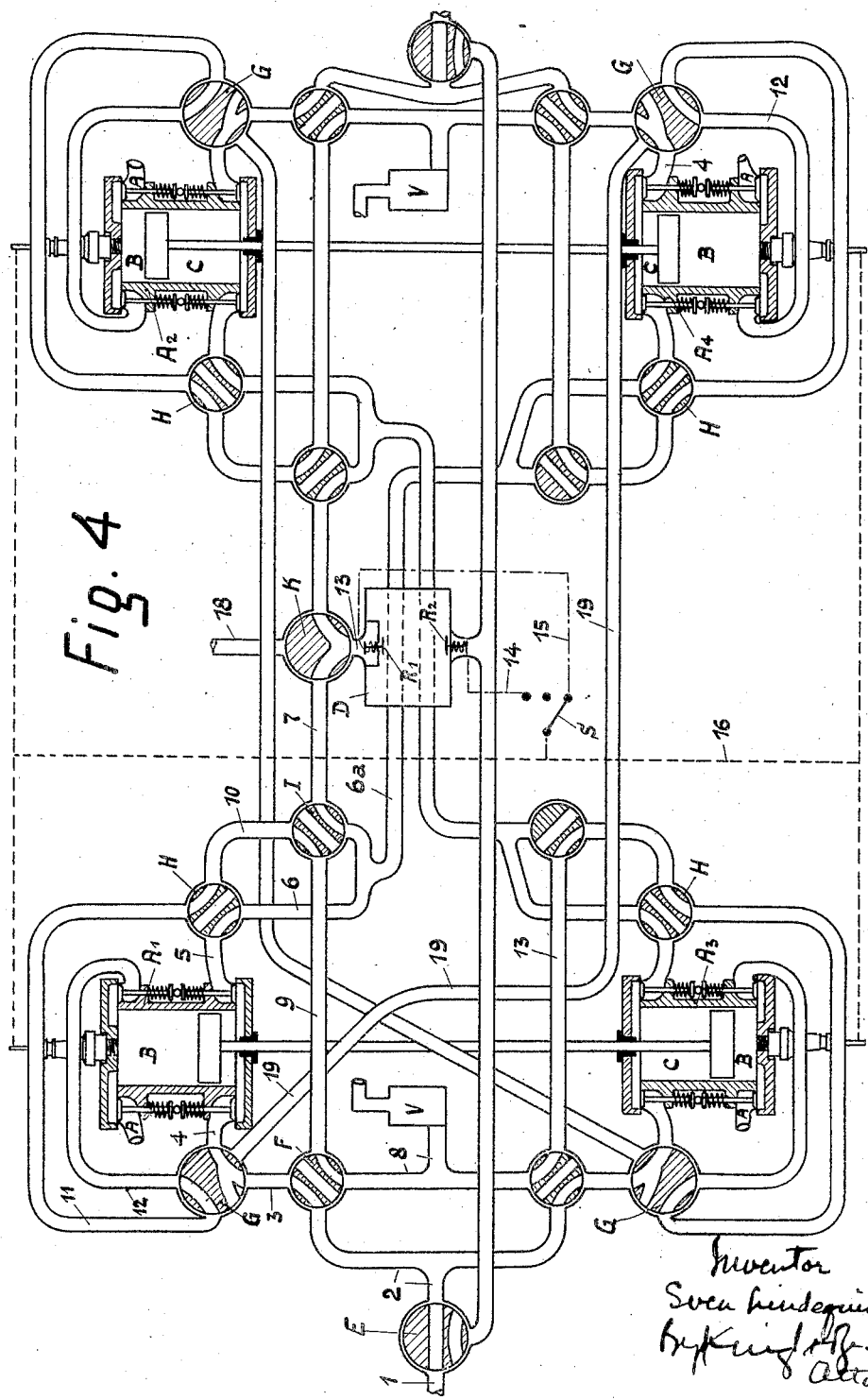

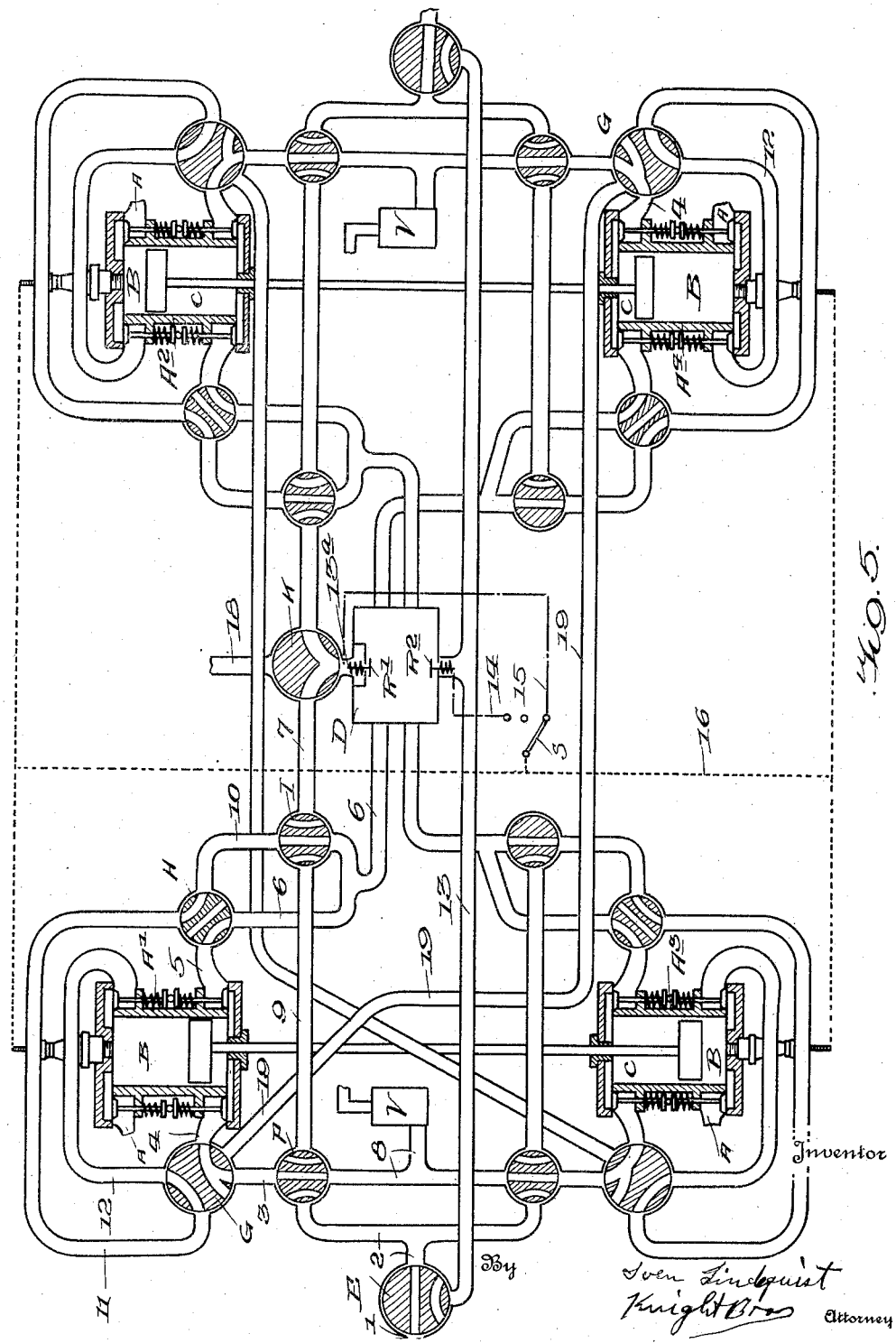

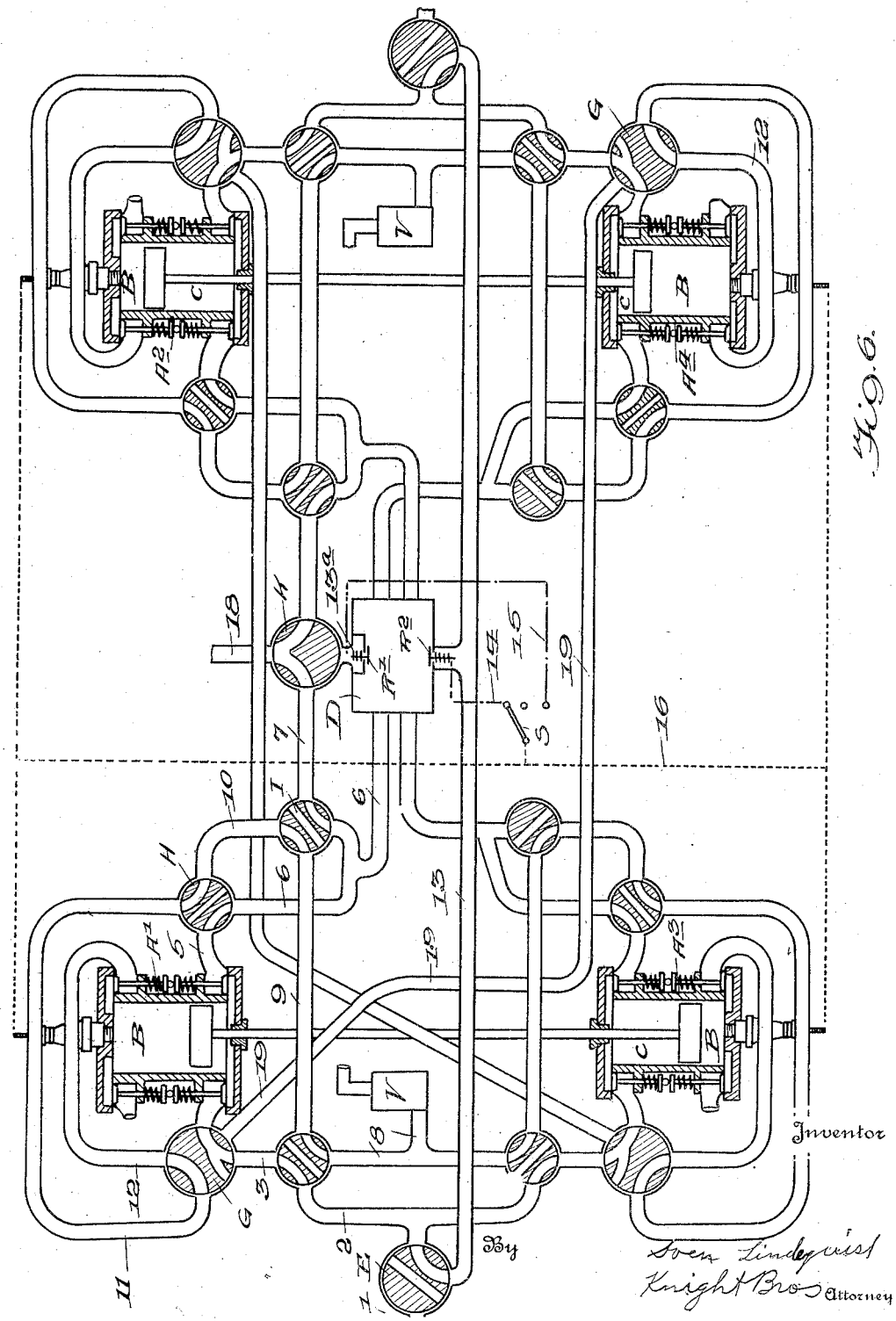

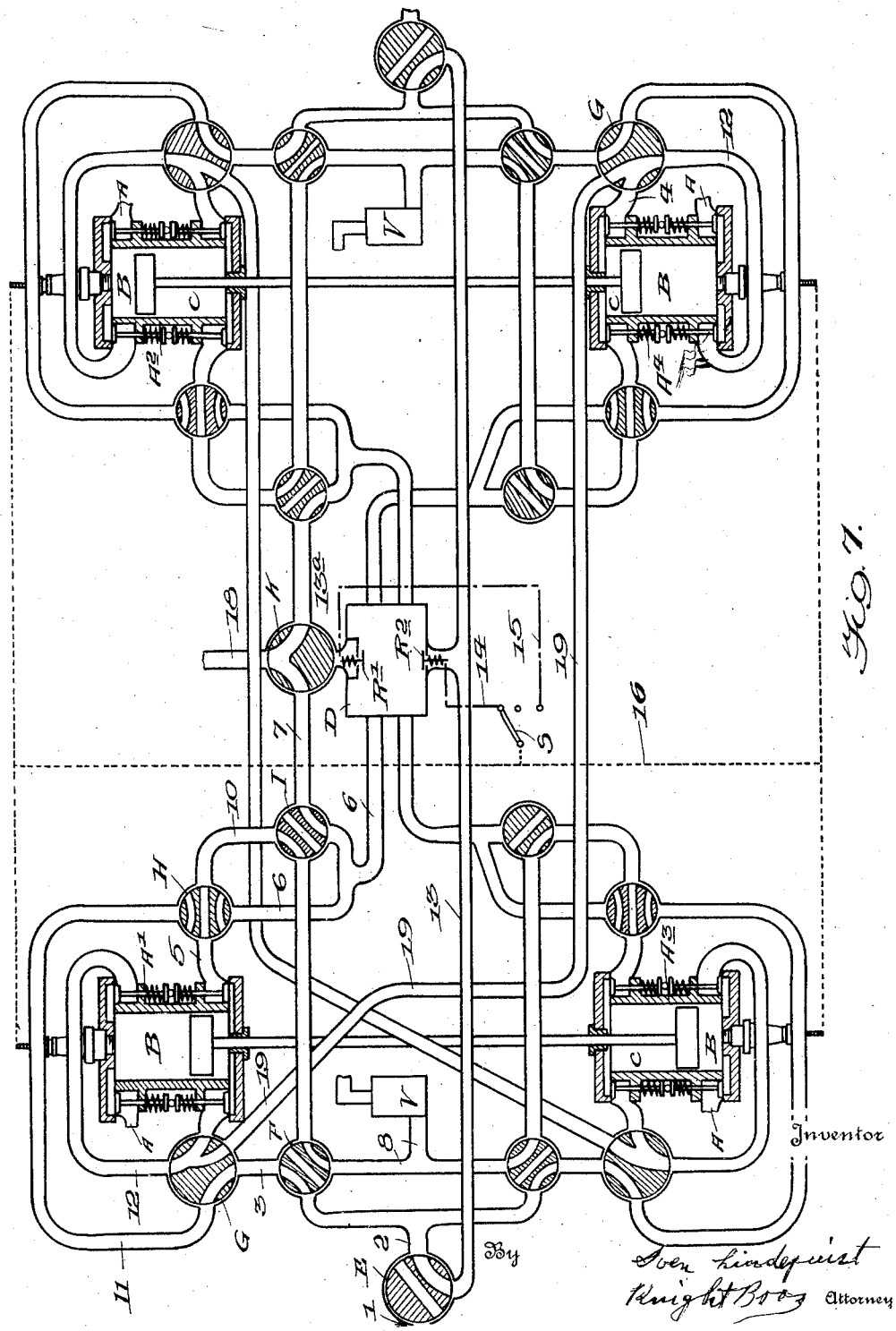

Patented June 28, 1927.

1,634,249

UNITED STATES PATENT OFFICE.

SVEN LINDEQUIST, OF WILMERSDORF, NEAR BERLIN, GERMANY.

EXPLOSION ENGINE WITH FOUR OR MORE WORKING CYLINDERS.

Application filed March 30, 1925, Serial No. 19,487, and in Germany May 1, 1923.

This invention relates to an explosion engine with four or more working cylinders, closed at both ends and working at one end as a compressor, and with a crosshead constructed to serve as a second compressor piston.

According to the invention the compressor charges from the compressor end of the working cylinder as well as from the crosshead cylinder are fed to a conduit which is common for the inlet valves of all the working cylinders so that, for instance in four stroke cycle engines, four compressor charges are at disposal for each working stroke. It has become known to construct explosion engines to work like compressor engines by closing the cylinders at both ends and by making the bottom part of the cylinder serve as compressor. In engines of this type, working in a four stroke cycle, two compressor charges are at disposal for each working cylinder charge. This means, the losses having been taken into consideration, an excessive charging or pre-compression of 190% of the working cylinder volume.

The invention serves for special purposes, for instance for high altitude flying machine motors or in general for motors which require a considerable over charging or a considerable compression of the air volume admitted. The object of the invention is realized by the simplest means and with only a slight increase in engine weight.

The effect may be further improved by arranging, besides the working piston which works as a compressor piston and besides the crosshead piston working in a compressor cylinder, a third piston in a compression cylinder, all compression spaces working, as stated above, on a common conduit leading to the inlet valves of the working cylinders. In this case eight compressor charges are at disposal for each working stroke in a four cylinder engine. If at each side of a common working space an aggregate of three pistons and of corresponding compressor spaces is arranged, and if all compressor spaces work on a common conduit leading to the inlet valves for the working spaces the possibility of pre-compressing the working space charge is still further increased.

The piston arranged between the crosshead piston and the working pistons may be mounted unpacked in the corresponding cylinder, in order to reduce the friction, as the compressor air flowing back between the piston and cylinder-wall, especially at high speed, is of no consideration in comparison with the other losses.

If the volume of the pipe conduits is made sufficiently small and if every two working pistons with corresponding compressor pistons work in opposite directions the peaks of the pressure curves in the pressure pipe connecting the compressors with the inlet valves of the working spaces arrive, independently of an eventual variation of the speed with excessive charging, at the correct moment at the inlet valve of the working space. In order that the opening time of the working space inlet valve may be adapted to the time at which the pressure peaks arrive, the control of the valve may be made adjustable, for instance by controlling each valve by two cam shafts which are arranged in such a manner that the position of the curves of both shafts can be varied with regard to one another.

The engine cylinders which contain the above mentioned piston aggregates are preferably arranged tangentially to a circle and the crank shafts are then situated in the points of intersection of the axes of the cylinder aggregates. On one crank shaft work always pistons of two or more cylinder aggregates, the number depending upon the number of cylinders arranged in a row in each tangential plane. On the crank shafts gear wheels may be keyed which mesh with a gear wheel on the main shaft to be driven.

The degree of excess charging, i. e. of the pre-compression of the charge, may be regulated by suitable means, for instance by directly connecting the compression spaces of at least two cylinders, working in opposite directions to each other by a conduit or regulating element. If this regulating element is fully opened the two compressors communicating through the connecting conduit have no effect on the pressure conduit. The air which has been previously sucked in is merely pushed over from one compressor cylinder into the other compressor cylinder.

If the regulating element shuts off the cross section of the conduit more or less, the discharge from the compressor into the pressure conduit is more or less increased. The discharge of compressed air can thus be regulated without any loss of work from 0 to the maximum. The charging of the working space can therefore be done through the compressors even at the lowest volume of compressed air, the efficiency of the engine being not essentially reduced. The formation of a pressure below atmospheric in the working conduit or in the admission conduit can therefore, if it should be desired, be avoided under any conditions. The connecting conduit between the compressors, mentioned above, may be situated in the cylinders; it might, however, be arranged outside the cylinders and instead of one such conduit several conduits may be employed.

Besides this connecting conduit between two compressor spaces working in opposite directions a device may be used by means of which the inlet openings of the compressors can be throttled so that, according to the degree of throttling, the discharge from the compressors is reduced. The charge at the admission or exhaust of the compressor may further be allowed to escape into the atmosphere.

The regulating element in the connecting conduit can be controlled automatically by the inner pressure of the compressor pressure pipe by making the inner pressure for instance act upon a piston adapted to be moved in opposition to a spring or upon any other suitable arrangement.

In order to enable that a regulation of the speed or any adjusting of the average compression pressure may be carried out through the intermediary of the connecting conduit, a regulating element to be controlled by hand may be arranged in the connecting conduit, besides the regulating element automatically controlled by the inner pressure of the compressor pressure conduit. For high altitude flying machine-engines a control element may be further arranged in the connecting conduit, the control of which element depends on the atmospheric pressure, or the regulating element for the distribution dependent on the inner pressure of the compressor pressure conduit may be rendered reversible so that its operation is made dependent on the pressure of the outer air.

It is further advisable to mount in the connecting conduit, between the compressed-air pipe and the control element for the regulating element, a check valve the spring of which is regulated so that it remains open at the pressure which normally exists in the pressure pipe and also when this pressure increases slowly, but is shut when sudden increases of pressure occur, so that such increases of pressure, which might occur for instance at the back flow of pressure from the working space into the compressor pressure pipe, cannot be propagated upon the sensitive distribution device. The compressor spaces, which are arranged one behind the other in axial direction, are best controlled by rotary valves common for every two compression spaces, the conduits from the compressors to the rotary valves being arranged one at the side of the other. When the speed of the rotary valve-shaft is half or one quarter of the speed of the engine shaft the shaft of the rotary valves may serve at the same time as a cam shaft for the valves of the working cylinders.

The pre-compression of the gases, which according to the invention can be increased to a high degree, can not only be utilized, as stated above, to increase the speed and to maintain the compression uniform in high altitude engines, but, at a certain manner of operation, the invention permits of manufacturing by the process of casting metal under pressure even those building elements, as for instance cylinders, pistons, cylinder covers and the like, which are submitted to high stress. The diameter of the bore of the cylinder is made considerably greater than the stroke, and, according to the invention, compressed air or gas mixture is admitted to the working space in regulating the admission pressure in accordance with the speed. The regulating is effected in such a manner, that a full charge is obtained at a low compression pressure in the working cylinder. This special construction of the engine has for its object to reduce the stress on the elements made by the process of casting metal under pressure.

Up to the present, so far as the process for casting metal under pressure was applied at all for the manufacturing of engine elements, only such building elements were produced by this process as were not exposed to high stress, as for instance the crank shaft bearings. The manufacturing of parts, exposed to high stress, as for instance the cylinder, appeared impossible as the resisting capability of the metal parts cast under pressure was too low to withstand the stresses which occur in the normally working engines. By the above stated special construction and operation of the engine the stresses are considerably reduced.

The excessive dimensioning of motors was hitherto used only for increasing the efficiency of the motor beyond the normal efficiency. According to the invention an excessive dimensioning is used preserving the normal efficiency so that it is possible to maintain in the working cylinder lower average explosion pressure than is possible with normally dimensioned cylinders. By this reduction of the explosion pressure the loading of the material is reduced at the same time, the piston stroke which is comparatively short in excessively dimensioned motors permitting of managing it with slow accelerating forces. When a construction of motor and an operating method as stated are employed the process of casting metal under pressure may be used also for the highly loaded engine elements without any danger of destruction of these elements by the loads which occur in service.

The invention permits further to obtain, in a comparatively simple manner, a reversibility of the motor. With this object in view the admission and exhaust conduits leading to and from the compression spaces may be fitted with reversing elements, for instance valves, so that the air pressure of an air reservoir capable of being filled by the compressors can be made to influence the compressor pistons, the ignition in the working space of the motor cylinder being rendered at the same time inoperative, whereby reversing of the motor is obtained. By arranging reversing elements in the admission conduit to the working spaces of the cylinder the use of gas-air mixture compressed by the cylinder compressor may be rendered possible.

An embodiment of the invention is shown, by way of example, in the accompanying drawings in which:—

Fig. 1 shows an end view, partly in longitudinal section of an engine having tangentially arranged cylinder aggregates.

Fig. 1ª is an enlarged section of a portion of Fig. 1.

Fig. 2 is a longitudinal section on line II—II of Fig. 1.

Fig. 3 shows diagrammatically the regulating device on the engine for the pressure in the compressor pressure pipe.

Figure 1:
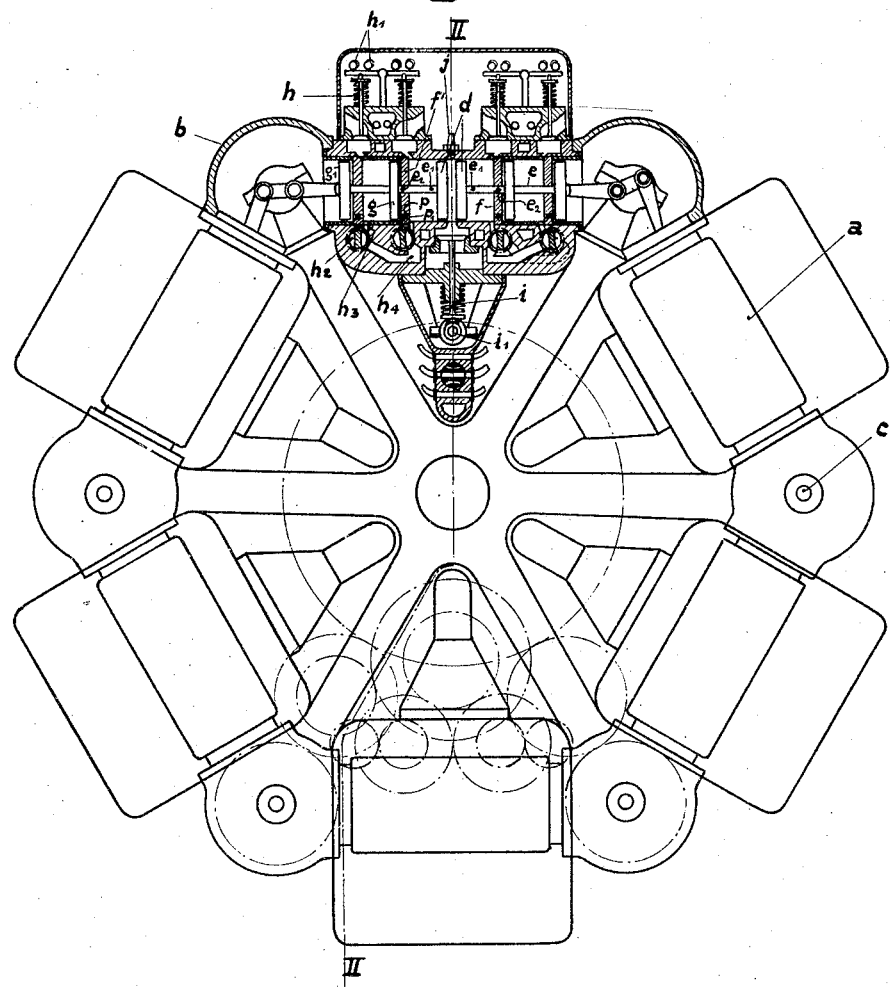

Figs. 4 to 7 illustrate diagrammatically the reversing mechanism on the engine, Fig. 4 showing the several elements of the mechanism in the position which corresponds to forward rotation of the engine without over loading, Fig. 5 showing them in the position corresponding with forward rotation with over loading, Fig. 6 corresponding to backward rotation without over loading and Fig. 7 corresponding to backward rotation with over loading.

Referring to Figs. 1 and 2 of the drawings six cylinder aggregates $a$, each aggregate comprising four cylinders, are tangentially arranged so that they are mounted concentrically around a common centre. Every two cylinder aggregates have a common crank case $b$ and a common crank shaft $c$ accommodated in the same.

In each of the cylinders of the aggregates two working pistons $d$ are arranged so that the pistons of each cylinder work in opposite directions.

Compressor pistons $g$ are mounted on the piston rods at the off sides of partitions $f$ and also the crosshead pistons $g_1$ which are separated from the compressor pistons by a partition $f_1$.

The working pistons $d$ and the crosshead piston $g_1$ are tightly guided in the cylinders, no packing being necessary for the piston $g$.

The space between the pistons $d$ serves as working space. The spaces between the pistons $d$, on the one hand, and the partition $f$, on the other hand, between the partition $f$ and the piston $g$, between the piston $g$ and the partition $f_1$, and between this partition $f_1$ and the piston $g_1$ serve as compressor spaces. The inlet ports of the compressor spaces are controlled by valves $h$ which are operated each by two cam shafts $h_1$. These cam shafts are coupled with their driving mechanism in such a manner that their positions with regard to one another and with regard to the driving mechanism can be changed. The simplest means of coupling would be the drawing along of the cam shaft by friction. For the same purpose arrangements of epicyclic gears may be employed. The discharge side of the compressors is controlled by rotary slide valves $h_2$ which are driven at ½ or ¼ of the speed of the motor shaft and can serve at the same time for operating the inlet or admission valves $i$ for the working space. The cam shafts $i_1$ for the operation of these admission valves $i$ for the working space has been shown, for clearness sake, directly underneath the valve rod.

The outlet ports $h_3$ for every two adjacent compressors, are arranged side by side so that the two compressors may be controlled by different compartments of the same rotary slide valve. Owing to the use of the rotary slide valve very long and narrow cylinder inlet and outlet slots can be used whereby the cylinder length and the height of the pistons are considerably reduced.

Farther down, with reference to Figs. 4–7 it will be described how the channels from the outlet compressor ports to the working space admission valves are controlled.

On the crank shafts $c$ gear wheels $k$ are keyed (Fig. 2). Intermediate gears $k_1$ connect gear wheels $k$ with a central toothed wheel $l$ keyed upon the shaft $m$. This shaft $m$ may serve for instance as a propeller axle. The shaft $m$ is journalled in a bearing $n$ fixed on the end face of the body formed by the cylinder aggregates.

The gear wheels which serve for driving the cam shafts $i_1$ and the rotary slide valves $h_2$ are driven from the intermediate wheels $k_1$. In the form of construction, shown by way of example, all pistons are of similar diameter. The diameters of the several pistons might, of course, be different when the cylinders are staged accordingly. Several of such staged pistons might be arranged the one behind the other so that they work as differential compressors. Differential compressors are for instance employed for the production of injection air for fuel when the engine operates upon the Diesel principle.

The conduits leading from the compressor outlet valves to the working space inlet valves, are, as already stated, as short and narrow as possible. It has been found that, when the shortest way is selected for the tubular conduits, they have, preferably, a diameter equal to $\frac{1}{4}$ of the cylinder bore in large size engines, $\frac{1}{3}$ in medium sized engines and to $\frac{1}{2}$ in small size engines.

For the above mentioned regulating of the inlet valves $i$, as regards adaptation to the time of arrival of the pressure peaks, it is sufficient if, for instance by arranging two cam shafts $i_1$ for each valve, the opening time of the valve $i$ is variable to the extent of about 20° with regard to the normal opening time.

The regulatability of the working space inlet valves permits of allowing under any conditions, even when the conditions of working are variable, sufficient time for the filling of the working space.

The adjusting of the cams for the purpose of regulation may either be effected so that the valve opens earlier than at normal adjustment or that it closes later. The entire opening time may remain uniform or be lengthened.

In order to regulate the quantity of air admitted to the working cylinder the cylinder bottoms $f$ and $f_1$, have a passage $p$, as shown in Figs. 1 and 1ª, through which a tubular slide valve is guided. Passages $p_1$ arranged transversely to the passage $p$ connect the compressor spaces with the passage $p$ and consequently with one another as soon as the tubular slide valve in the passage $p$ uncovers the orifices of the passages $p_1$. A part of the compressor charge is then pushed over from the one compressor into the other through the passages $p_1$, more of the compressor charge of one compressor flowing over into the adjacent compressor space as the passages $p_1$ are opened wider. The quantity of compressed air delivered by the compressors into the pressure pipe $h_4$ is varied accordingly. The amount of compressed air can further be varied by adjusting the two cams $h_1$ belonging to one and the same compressor inlet valve relatively to each other, so that the inlet valve opens for a longer or shorter time. The longer it is open the more air can be sucked in, the shorter it is open the less air is sucked in.

The arrangement permits of reversing the engine from compressing action to sucking action across the compressors without the necessity of disconnecting the compressors. By means of this arrangement it is therefore possible to avoid the pressure below the atmospheric which at the admission of the mixture of compressed air and gas without the intermediary of the compressor flows into the inflow conduit. In this case it is merely necessary that the engine be constructed from the beginning so that, at the lowest efficiency which is to be considered economical, the engine works with minimum compression in the working cylinder space, which compression corresponds to its lowest efficiency. When selecting this lowest average compression pressure of the working cylinders prior to the construction, it has to be taken into consideration that there must always be sufficient charge for the engine at disposal in the charging elements so that the highest calculated speed can be obtained at any desired over-charge without losses of the filling of the working cylinder. In order to increase the speed the pressure in the over flow pipe is progressively increased.

In this manner any pressure below the atmospheric is avoided in the overflow pipe except during the starting period at which the engine works across the compressors as suction engine. This starting period is below the lowest efficiency to be considered. Engines may evidently be built for the highest admissible average compression pressure and which up to this pressure work with a lower pressure than the atmospheric.

Owing to the retardation of the pressure peaks, and in order to obtain small sized valves or short valve strokes and the like, higher speeds in the overflow pipes are desirable and, with this object in view, higher pressures. The first mentioned method is therefore the most advantageous for high speed engines; the two methods might eventually be combined.

In order to control, by means of the pressure in the compressor pressure pipe, the tubular slide valve in the passage $p$, which might be constructed like a cock, this compressor pressure pipe $h_4$ may be connected, as shown in Fig. 3, by means of a branch pipe $s$ with a control device $t$ which automatically acts upon the control element arranged in the passage $p$.

This control device $t$ consists of a cylinder, in which a piston $u$ is movably arranged, exposed to the action of a spring $w$. The pressure in the pressure conduit $h_4$ acts upon the top side of this piston and has the tendency to press the piston downward against the action of the spring $w$. The spring is regulated so that at normal pressure in the pressure conduit $g$ no movement takes place, when the normal pressure is exceeded the piston is pressed downward so that it makes the lever $y$ oscillate around its pivot point $z$ through the intermediary of the piston rod $x$. The lever transmits its movement by means of a link upon the control lever of the regulating element $v$.

When the piston $u$ is in the normal or highest position the regulating element $v$ is closed. As soon as the piston $u$ begins to descend the regulating element opens. By regulating the pressure of the spring, the adjusting screw of which, not shown, co-operates with a scale, also not shown, the engine can be adjusted to the desired everage compression pressure. As soon as this average compression pressure is exceeded the valve opens and re-establishes the desired average compression pressure.

In order to make the mechanism shown in Fig. 3 work, if necessary, in dependency on the atmospheric pressure, the pipe $s$ may be arranged so that it can be shut off by a cock, a second pipe $s_1$ being provided at the bottom end of cylinder $t$. This pipe $s_1$ is also adapted to be shut off by a cock or by a similar device. When the pipe $s$ is shut off and the pipe $s_1$ opened a constant air pressure exists in the upper part of the cylinder $t$, while in the bottom part of this cylinder the pressure varies in accordance with the atmospheric pressure. As soon as this pressure sinks below a predetermined degree the pressure in the top part of the cylinder $t$ pushes the piston $u$ downwards and operates thus the regulating element $r_1$.

Instead of the means shown any other pressure relay of known type may be employed to control the regulating element $r_1$ in dependency on the atmospheric pressure. The control must always be effected in such a manner that at decreasing pressure of the atmosphere the regulating element is moved in the direction to close the passages $p_1$ so that with the decrease of the suction pressure the compressor efficiency increases and so that, consequently, the pressure in the compressor pressure pipe is maintained uniform.

A check valve in the intermediate conduit $s$ protects the regulating mechanism against the propagation of excessive pressures at the backflow of pressure from the working space into the compressor pressure pipe.

When the above described automatically controlled regulating element is used it is also necessary that this regulating element $r$ be capable of being controlled by hand, for instance so that to the control lever $r_1$ different positions may be given with regards to the pull rod $r_2$ which connects the control lever $r_1$ with the lever $z$. A second regulating element, adapted to be operated by hand, might however be arranged at the side of the regulating element $v$ or concentrically in the regulating element which is adapted to be controlled only automatically.

The hand-controlled element serves then to produce variations of the speed of the engine by its displacements.

The hand-controlled regulating element is normally in the open position. The automatically controlled regulating element, however, is normally, when the engine is working at normal efficiency, only slightly open. By partial or complete closing of the hand-controlled regulating element the pressure produced by the compressors is consequently increased so that the engine adopts a higher speed. By the automatic control of the pressure in the compressor pressure pipe the following advantages, amongst others, are obtained.

With the aid of the same, engines of much lower average compression pressure may be built than at present.

By the control of the regulating element by hand the efficiency (volume-capacity) can be altered without any alteration of the structure of the pressure curve in the compressor pressure pipe.

The atmospheric regulation of altitude-speed does away at the same time automatically with the sucking in losses of the compressors increasing with the higher speed.

In order to be able to reverse the engine at will to forward rotation with or without over loading and to backward rotation with or without over loading the connection of the compressor spaces with the working spaces of the engine is realized, in the form of construction illustrated by way of example, as diagrammatically shown in Figs. 4–7. In order to avoid complication of the illustration the diagram is shown only for one compressor space of each cylinder, four cylinders being represented. It is obvious that the other compressors arranged in each cylinder of the engine do not alter the connection as all compressors of one cylinder communicate with one and the same pressure pipe $h_4$.

According to the diagram shown in the Figs. 4–7 the engine cylinders $A_1$, $A_2$, $A_3$, $A_4$ have each working spaces B and compressor spaces C. The pistons of every two cylinders, viz of cylinders $A_1$ and $A_3$ and of $A_2$ and $A_4$ work in opposite directions. This is expressed in the drawing by showing the piston rods connected. For all cylinders one compressed air space D is arranged which, during the time the working cylinders work with uncompressed air, is charged by the compressors C. This space for compressed air D can be utilized, according to the invention, in connection with several valves, for reversing the engine.

For forward rotation without over-loading (Fig. 4) the pipe $l$ supplies to the compressor cylinder the suction air directly from the atmosphere. With this object in view the valve E is adjusted for communication of pipe $l$ to pipe 2. The pipe 2 leads to the valve F which, in the position shown in Fig. 4, connects the pipe 2 with the pipe 3 which itself is connected by valve G with the compressor-intake pipe 4.

The compressor outlet pipe 5 leads through valve H to the pipe 6. The pipe 6 leads through valve I to the pipe 7 which leads through valve K into the reservoir D for compressed air. At the orifice of the conduit 13a, leading into the compressed air reservoir D, a check valve $R_1$ is arranged which can be temporarily maintained in open position with the aid of a mechanism which will be hereinafter described and for a purpose which will be also hereinafter described. The same arrangement is used in connection with a second check valve $R_2$ in the orifice of a conduit 13 in the compressed air reservoir D.

The compressed air is therefore fed from the compressor to the compressed air reservoir.

The compression spaces of all other compressors operate in a similar manner.

The air is supplied to the working cylinder from the carburettor V, through conduit 8, valve F, conduit 9, valve I, conduit 10, valve H, conduit 11, valve G and conduit 12, the exhaust port A of the working cylinder communicating directly with the atmosphere.

At forward rotation with over-loading (Fig. 5) the valve F is adjusted to the position of passage from the pipe 8, coming from the carburettor, to the pipe 4 which leads through the valve G to the compressor inlet S, so that the compressor sucks in air saturated with fuel. The valve I is in the position of passage from pipe 6 to pipe 10. The fuel and air mixture is conducted through the compressor outlet pipe 5, valve E, pipe 6, valve I, pipe 10, valve H, pipe 11, valve G, pipe 12 to the working cylinder. The combustion gases flow out of the working cylinder through the exhaust port A.

For reversing from forward rotation without over-loading to forward rotation with over-loading it is merely necessary to rotate the valves F and I through 45°.

Backward rotation without over-loading is obtained by giving to the valves E and K the positions shown in Fig. 6, i. e. these valves are rotated from the position for forward rotation without over-loading through 45° and 180° respectively so that the conduit 2 is no longer connected with the pipe $l$ communicating with the atmosphere but the pipe 13, which communicates with the compressed-air reservoir D, the pipe 7 being no longer connected with the pipe 13a, which leads to the compressed-air reservoir D but with the pipe 18 communicating with the atmosphere. Simultaneously with this reversing the switch S is brought from the position shown in Fig. 4, in which the electric current controlled by the switch has lifted the compressed air valve $R_1$ by means of a magnet, into the position shown in Fig. 6. In this position the electric current lifts the valve $R_2$ with the aid of electro-magnets. The same current acts, the switch S being in the position Fig. 6, upon a device which interrupts the sparking plug current. These current connections are shown at 14, 15 and 16.

The operation is, in the position of the valves shown in Fig. 6, as follows:—

The compressed air flows from the reservoir D through the conduit 13 through valve E, conduit 2, valve F, conduit 3, valve G, conduit 4 to the compressor. The piston is at first retarded by the action of the compressed air and stopped whereupon it drives the crank shaft in the opposite direction. The sparking plugs are switched out, as mentioned above, until the reversal begins, to be switched in again by hand after the backward rotation has started.

In the process for initiating the reversal the compressed air flows out of the compressor through the outflow pipe 5 and escapes through valve H, conduit 6, valve I, conduit 7, valve K and pipe 18 into the atmosphere.

Simultaneously with the switching-in of the sparking plugs, which is effected by bringing the switch S from the position shown in Fig. 6 into the position shown in Fig. 4, the valve $R_2$ is left to itself in consequence of the switching-off of the current and it is consequently closed by the action of its spring. It acts now as check valve. The air-flow through the compressors is now, the air pressure from reservoir D being no longer capable to act effectively upon the compressor, as follows: pipe 18, valve R, pipe 7, valve I, pipe 6, valve H, pipe 5, compressor, pipe 4, valve G, pipe 3, valve F, pipe 2, valve E, pipe 13, compressed air reservoir D.

The working space B of the engine, which is operative at the reversal, sucks the fuel and air mixture in through the carburettor, conduit 8, valve F, conduit 9, valve I, conduit 10, valve H, conduit 11, valve G and conduit 12 and delivers it through the outlet valve A. It is not necessary to adjust the control of the inlet valve at the movement just described, as the opening angle of the valve is only about 10°. When the opening angle of the valve is greater an adjusting of the cam for the working space inlet valves ought evidently to take place for the reversing in order that the sucking in for the going backwards begins at the correct moment.

In the operations which have been described the valves G and H have remained at rest. For forward rotation without and with over-loading and for backward rotation without over-loading these valves might consequently be suppressed and simple pipe connections might be substituted for the same. These valves are required for backward rotation with over-loading as can be seen from Fig. 7.

For reversing from forward rotation with over-loading to backward rotation with over-loading all the valves are required.

By adjusting the valve F the condition for the forward rotation without over-loading is at first established, whereupon, by rotating the valves E through 45° and the valves K through 180°, and reversing the switch S at the same time, the condition as shown in Fig. 6 for backward rotation without over-loading is established in which the engine is at first stopped by the air flowing out of the reservoir D through the valve R² and then brought to backward rotation.

The ignition can now be re-established so that the engine is driven again from the working space, but in reverse direction. With this object in view the switch S is brought from the position shown in Fig. 7 into the middle position so that, simultaneously with the switching in of the ignition, the two valves R¹ and R² are liberated and act consequently as check valves. The valves G and H are then brought into the position shown in Fig. 7. In this position the compressor sucks fuel and air mixture in from the carburettor V through conduit 8, valve F, conduit 9, valve I, conduit 10, valve H, conduit 5 and the compressor valve and delivers it through the other compressor valve S, conduit 4, valve G and conduit 12 compressed according to the position of the cylinder inlet valves, to the working space of the same cylinder or through conduit 4, valve G, intermediate conduit 19, valve G of the other cylinder and conduit 12 of the other cylinder to the working space of this other cylinder, two cylinder volumes of fuel-air-mixture being supplied, in the four stroke cycle engine, to the working space of each cylinder at the suction stroke of the piston.

The same reversing mechanism could also be employed as it is for the two cycle engine, some valves being however omitted.

Evidently care has to be taken in a reversing mechanism of this type that the ignition magnet and the water and oil pumps can run to the right and to the left or can be coupled or uncoupled automatically, separate magnets and pumps working on backward rotation being provided.

The engine will, at the moment of the reversing, never be at the dead center position if it comprises at least six cylinders or four cylinders in V shape. If an engine with a lower number of cylinders should, at the reversing remain in the dead center position, a starting in opposite direction can take place to go over into the original direction of rotation.

The reversing mechanism may evidently be utilized also as starter in both directions.

Every working space has several sparking plugs, at least two, as can be seen from Fig. 2. These sparking plugs are electrically connected in such a manner that they are successively operated, i. e. during different explosion strokes of the piston. The object of this utilization of several sparking plugs is to reduce the heating of them.

When the engine does not have to be employed for especially high speed or especially high efficiencies, but for normal efficiencies, the average compression pressure and consequently the explosion pressure may, on account of the over-dimensioning of its cylinders, be kept lower than is possible in other engines with normal efficiency. The pre-compression pressure is then utilized, as mentioned above, merely for the complete filling of the working space within the time at disposal. In this case the strongly loaded elements of the engine, for instance the cylinders, can also be made by the process of casting metal under pressure. When the engine works as a two stroke cycle engine the crank cases may be further utilized as compressors in order to produce the required scavenging air so that, in this case, the compresssion spaces of the cylinders are again at disposal for the filling proper of the working space.

The piston rod $e$ of the engine has, as can be seen from Figs. 1, and 1ª, passages $e_1$, $e_2$ at two points. The piston rod and the piston $d$ are hollow. From the orifice of passage $e_1$ a tubular conduit arranged in the hollow piston rod leads into the hollow piston, a second tubular conduit, also situated in the hollow piston, leads from the hollow piston to the orifice of passage $e_2$ of the piston rod. The orifices of the passages $e_1$ are close to the piston $d$ and those $e_2$ are close to the piston $g$. As soon as the pistons $d$ move away from one another and produce consequently a pressure in the compression spaces situated between the pistons $d$ and the partitions $f$, compressed air flows from the compression space into the hollow piston wherein air, having flown along the piston walls, flows out through the tubular conduit leading to the orifice of passage $e_2$ and into the compression space which is situated between the partition $f$ and the piston $g$. The piston $g$ produces in the said space a pressure below the atmospheric when the piston $d$ produces in the adjacent compression space a pressure above atmospheric.

I claim:—

1. In an internal combustion engine, a working cylinder closed at both ends, a piston in said cylinder, the space at one end of said cylinder serving as combustion chamber and the space at the other end of said cylinder serving as compression chamber, a crosshead in the form of a piston connected with said first named piston, a compression cylinder for said crosshead piston, an inlet port for said combustion chamber, outlets for said compression chambers, and a common conduit connecting said outlets to said inlet port.

2. In an internal combustion engine, a working cylinder closed at both ends, a piston in said cylinder, the space at one end of said cylinder serving as combustion chamber and the space at the other end of said cylinder serving as compression chamber, a crosshead in the form of a piston connected with said first named piston, a compression cylinder for said crosshead piston, the compression strokes of said pistons alternating, an inlet port for said combustion chamber, outlets for said compression chambers, and a common conduit connecting said outlets to said inlet port.

3. Structure according to claim 1, wherein a piston is interposed between the two named pistons and connected therewith, a closed cylinder for said third piston whereby a double acting compressor unit is formed, and connecting means between said unit and said inlet port.

4. In an internal combustion engine, a plurality of closed cylinder elements, interconnected pistons working in said cylinder elements, the adjacent ends of said cylinders forming compression chambers, and the opposite end of one of said cylinders forming a combustion chamber, an inlet port for said combustion chamber, outlets for said compression chambers, a common conduit connecting said outlets to said inlet port, and means for providing communication between the adjacent ends of said cylinders, for the purpose described.

5. Structure according to claim 4, wherein regulating means are inserted in said communication means.

6. Structure according to claim 4, wherein regulating means are inserted in said communication means, and means operable in dependence on a pressure factor for controlling said regulating means.

7. Structure according to claim 4, wherein regulating means are inserted in said communication means, and means operable in dependence on the pressure in the connecting means between said compression chambers and combustion chamber for controlling said regulating means.

8. Structure according to claim 4, wherein regulating means are inserted in said communication means, means operable in dependence on the pressure in the connecting means between said compression chambers and combustion chamber for controlling said regulating means, and a check valve for protecting said controlling means from abnormal pressures in said last named connecting means.

9. In an internal combustion engine, a working and compression piston, a closed cylinder therefor forming combustion and compression chambers, an inlet port for the combustion chamber, means connecting the compression chamber with said port, an inlet control valve for said compression chamber, and operating means for said valve comprising a pair of cams, said cams being adjustable relative to each other for regulating the open period of said valve.

10. In an internal combustion engine, a working cylinder closed at both ends, a piston in said cylinder, the space at one end of said cylinder serving as combustion chamber and the space at the other end of said cylinder serving as compression chamber, a crosshead in the form of a piston and connected with said first named piston, a compression cylinder for said crosshead piston, a passageway leading to said combustion chamber, ports connecting said compression chambers to said passageway and lying side by side, and a rotary outlet valve common to both of said ports.

11. In an internal combustion engine, a cylinder closed at both ends, a piston dividing said cylinder into combustion and compression chambers, a reservoir, communicating means between said compression chamber and said reservoir, and control means in said communicating means, whereby, the ignition devices of the combustion chamber being rendered inoperative, said control means are operable for admitting the pressure of said reservoir in said cylinder counter to the movement of said piston for reversing the engine.

12. In an internal combustion engine, a cylinder closed at both ends, a piston dividing said cylinder into combustion and compression chambers, a reservoir, communicating means between said compression chamber and said reservoir, control means in said communicating means, whereby, the ignition devices of the combustion chamber being rendered inoperative, said control means are operable for admitting the pressure of said reservoir in said cylinder counter to the movement of said piston for reversing the engine, a conduit between said reservoir and said combustion chamber, and a carburetor connectible with said reservoir through said compression chamber.

13. An explosion engine comprising in combination a working cylinder closed at both sides and working at one end as compressor, a crosshead constructed as second compressor piston, a cylinder therefor, inlet valves for the working space, and a common conduit leading to said inlet valves, the compressor charges from the compressor side of the working cylinder as well as from the crosshead piston cylinder being delivered to said common conduit, admission conduits and exhaust conduits for the compressor spaces, a reservoir for compressed air connected with said conduit, regulating elements in said conduits, the air pressure of said reservoir filled from said compressors being adapted to act upon said compressor pistons whereby, the ignition in the working space being at the same time cut out, the reversal of said engine is effected.

14. An explosion engine comprising in combination a working cylinder closed at both sides and working at one end as compresser, a crosshead constructed as second compressor piston, a cylinder therefor, inlet valves for the working space, and a common conduit leading to said inlet valves, the compressor charges from the compressor side of the working cylinder as well as from the crosshead piston cylinder being delivered to said common conduit, admission conduits and exhaust conduits for the compressor spaces, a reservoir for compressed air connected with said conduits, regulating elements in said conduits, so that the air pressure of said reservoir filled from said compressors is adapted to act upon said compressor pistons whereby, the ignition in the working space being at the same time cut out, the reversal of said engine is effected, admission conduits for the working spaces, and regulating elements in said admission conduits whereby the gas-air mixture compressed in the cylinder compressors is admissible to the working space for the reverse operation of the engine.

15. In combination with the device set forth in claim 10, an engine shaft connected to said piston and said crosshead, valves for said combustion chamber, and a common cam shaft for operating said rotary outlet valve and said combustion chamber valves.

The foregoing specification signed at Berlin this 27th day of February, 1925.

SVEN LINDEQUIST.